(12) United States Patent
Mohebi (10) Patent No.: US 12,068,927 B1
(45) Date of Patent: Aug. 20, 2024

(54) SYSTEMS AND METHODS FOR OPTIMIZING FACILITY ASSET OPERATION

(71) Applicant: Argus Consulting, Inc., Overland Park, KS (US)

(72) Inventor: Meraj Mohebi, San Diego, CA (US)

(73) Assignee: ARGUS CONSULTING, INC., Overland Park, KS (US)

( * ) Notice: Subject to any disclaimer, the term of this patent is extended or adjusted under 35 U.S.C. 154(b) by 0 days.

(21) Appl. No.: 18/226,839

(22) Filed: Jul. 27, 2023

(51) Int. Cl.
| | |
|---|---|
| *H04L 41/22* | (2022.01) |
| *G05B 19/418* | (2006.01) |
| *H04L 41/06* | (2022.01) |
| *H04L 41/08* | (2022.01) |
| *H04L 67/12* | (2022.01) |

(52) U.S. Cl.
CPC .......... *H04L 41/22* (2013.01); *G05B 19/4185* (2013.01); *H04L 41/06* (2013.01); *H04L 41/0889* (2013.01); *H04L 67/12* (2013.01)

(58) Field of Classification Search
CPC .......... H04L 67/025; H04L 67/12–125; G05B 19/00–46
See application file for complete search history.

(56) References Cited

U.S. PATENT DOCUMENTS

| | | | | |
|---|---|---|---|---|
| 10,956,808 | B1 * | 3/2021 | Bhardwaj | G06N 3/045 |
| 2009/0028184 | A1 * | 1/2009 | Carpman | G05B 19/058 |
| | | | | 370/466 |
| 2010/0033318 | A1 * | 2/2010 | Tampke | H04M 11/002 |
| | | | | 340/531 |
| 2011/0009984 | A1 * | 1/2011 | Mukhi | G05B 23/0232 |
| | | | | 700/83 |
| 2011/0082596 | A1 * | 4/2011 | Meagher | H02J 13/00017 |
| | | | | 700/291 |
| 2016/0132046 | A1 * | 5/2016 | Beoughter | G06F 16/248 |
| | | | | 700/17 |
| 2018/0024847 | A1 * | 1/2018 | Campbell | G05B 19/41855 |
| | | | | 715/708 |
| 2019/0116080 | A1 * | 4/2019 | Oshima | H04L 67/561 |
| 2022/0026883 | A1 * | 1/2022 | Oroel | H04L 41/0806 |
| 2022/0057780 | A1 * | 2/2022 | Higashiya | G06F 3/14 |
| 2022/0247188 | A1 * | 8/2022 | Manikfan | H02J 3/32 |
| 2023/0012038 | A1 * | 1/2023 | Iyer | H02J 13/00002 |
| 2023/0315072 | A1 * | 10/2023 | Santoso | G05B 19/4188 |
| | | | | 700/96 |

* cited by examiner

*Primary Examiner* — Brendan Y Higa
(74) *Attorney, Agent, or Firm* — Polsinelli PC (57) ABSTRACT

Systems and methods for determining parameters for facility assets at an operational facility site. The method including receiving operational data associated with facility assets from a facility computing device, processing the operational data to generate asset data, communicating the asset data to a facility asset parameter computing device using a first communication link, generating asset parameters using the asset data, generating user interfaces to indicate the asset parameters, and communicating the user interfaces to the facility computing device via a second communication link to cause the facility computing device to indicate the user interfaces.

20 Claims, 9 Drawing Sheets

SYSTEMS AND METHODS FOR OPTIMIZING FACILITY ASSET OPERATION

FIELD

Aspects of the present disclosure generally relate to systems and methods for determining real-time facility asset parameters and in some instances optimizing operation of a facility accordingly.

BACKGROUND

Industrial facilities typically operate a myriad of different types of facility assets (e.g. equipment, device, apparatuses, systems, etc.) with various operational and maintenance requirements. Substantial investments are made to monitor the equipment and perform ongoing maintenance to prevent equipment failures, downtime, and lost revenue. For instance, maintenance personnel are tasked with daily tasks to confirm that each individual equipment piece of the different equipment types at the facility is operating correctly and meeting industry standards. As such, maintenance personnel often travel between different equipment locations at the industrial facility throughout the workday to perform physical inspections of the equipment. In large industrial facilities, this process can take hundreds of hours of labor as teams of maintenance people perform hundreds of different maintenance tasks for a variety of equipment types each day.

Accordingly, performing equipment management, including monitoring and maintenance, at industrial facilities incurs significant costs. Exacerbating these challenges, management cost can be difficult to quantify and opportunities for improvement difficult to identify.

It is with these observations in mind, among others, that various aspects of the present disclosure were conceived and developed.

SUMMARY

Implementations described and claimed herein address the foregoing problems by providing systems and methods to generate facility asset parameters using real-time operation data. The operation data is collected from one or more sensors associated with various facility assets such as, for example, tanks, pumps, filters, uninterruptible power supplies (UPS), power supply units, and any other major facility equipment. The one or more sensors include temperature sensors, flow sensors, level sensors, and the like. The operational data is processed using a gateway device (e.g., a protocol converter device) before communication to a computing device via an isolated communication link that is independent from the facility's internet infrastructure. The disclosed architecture offers a read-only, encrypted and isolated flow of data from the facility's supervisory control and data acquisition (SCADA) system that is used for normal operation of the facility.

In some examples, a method includes receiving operational data associated with one or more facility assets from a facility computing device, the operational data acquired via one or more sensors associated with the one or more facility assets, processing, via a gateway device, the operational data to generate asset data, communicating, via a networking device, the asset data to a facility asset parameter computing device using a first communication link, generating, via the facility asset parameter computing device, one or more asset parameters using the asset data, generating, via the facility asset parameter computing device, one or more user interfaces to indicate the one or more asset parameters, and communicating the one or more user interfaces to the facility computing device via a second communication link to cause the facility computing device to indicate the one or more user interfaces.

In some examples, a system includes a gateway device configured to receive operational data associated with one or more facility assets from a facility computing device, the gateway device configured to process the operational data to generate asset data, a networking device configured to communicate the asset data via a first communication link, and a facility asset parameter computing device configured to receive the asset data via the first link and generate one or more user interfaces indicating one or more asset parameters, the one or mor user interfaces communicated to the facility computing device via a second communication link to cause the facility computing device to indicate the one or more user interfaces.

In some examples, a non-transitory computer readable medium storing instructions, which when executed by at least one data processor, result in operations including receiving operational data associated with one or more facility assets from a facility computing device, generating asset data by processing the operational data, communicating the asset data to a facility asset parameter computing device using a first communication link, generating one or more asset parameters using the asset data, generating one or more user interfaces to indicate the one or more asset parameters, and communicating the one or more user interfaces to the facility computing device via a second communication link to cause the facility computing device to indicate the one or more user interfaces.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the present disclosure involve systems and methods for determining real-time facility asset parameters. Facility assets (e.g., equipment, devices, systems, apparatuses, components, etc.) can be located at any type of operational facility, such as, a refinery, a manufacturing plant or factory, a warehouse, a distribution center, a data center, a research and development facility, a laboratory, a military base or installation, an airport, a truck terminal, an industrial park, combinations thereof, and the like. By determining the facility asset parameters in real-time, user interfaces associated with the facility asset parameters can be generated, managed, and displayed at various devices to provide real-time information regarding the facility assets and optimize operational efficiency of the operational facility. For instance, a parameter computing device can include multiple applications operating together on different devices with different levels of connectivity, such as, a cloud-based application, to interact with devices at the operational facility. This arrangement improves asset management through a platform that processes data in real-time to generate user interfaces that provide real-time analytics and operational recommendations to facility operators. Furthermore, this arrangement provides a read-only, encrypted and isolated flow of data that is used to determine the facility asset parameters.

As such, the system and methods disclosed herein can be used to create a user interface indicating facility asset parameters (e.g., represented using a business intelligence dashboard, an engineering dashboard, an operation and maintenance dashboard, a pump dashboard, and/or a tank dashboard) used for managing facility asset maintenance, inspection, and operation. The facility asset parameter computing device uses real-time signals acquired, for example, from field sensors measuring various parameters in the field, and continually updates the parameters via data syncs. These techniques can improve tracking the facility asset operations and maintenance, as well as improving business intelligence by collecting highly granular data related to real-time statuses of the assets, which can be aggregated and analyzed to determine costs and inefficiencies associated with the facility assets (e.g., by calculating an amount of labor hours associated with facility assets, an amount of equipment breakdowns, or the like) classifiable by equipment type, manufacturer, operational site, and combinations thereof. Additionally, the data can be used to generate warnings that can be sent to various user devices to alert a user about potential issues with the facility assets. Additional advantages will become apparent from the disclosure herein.

Figure 1:
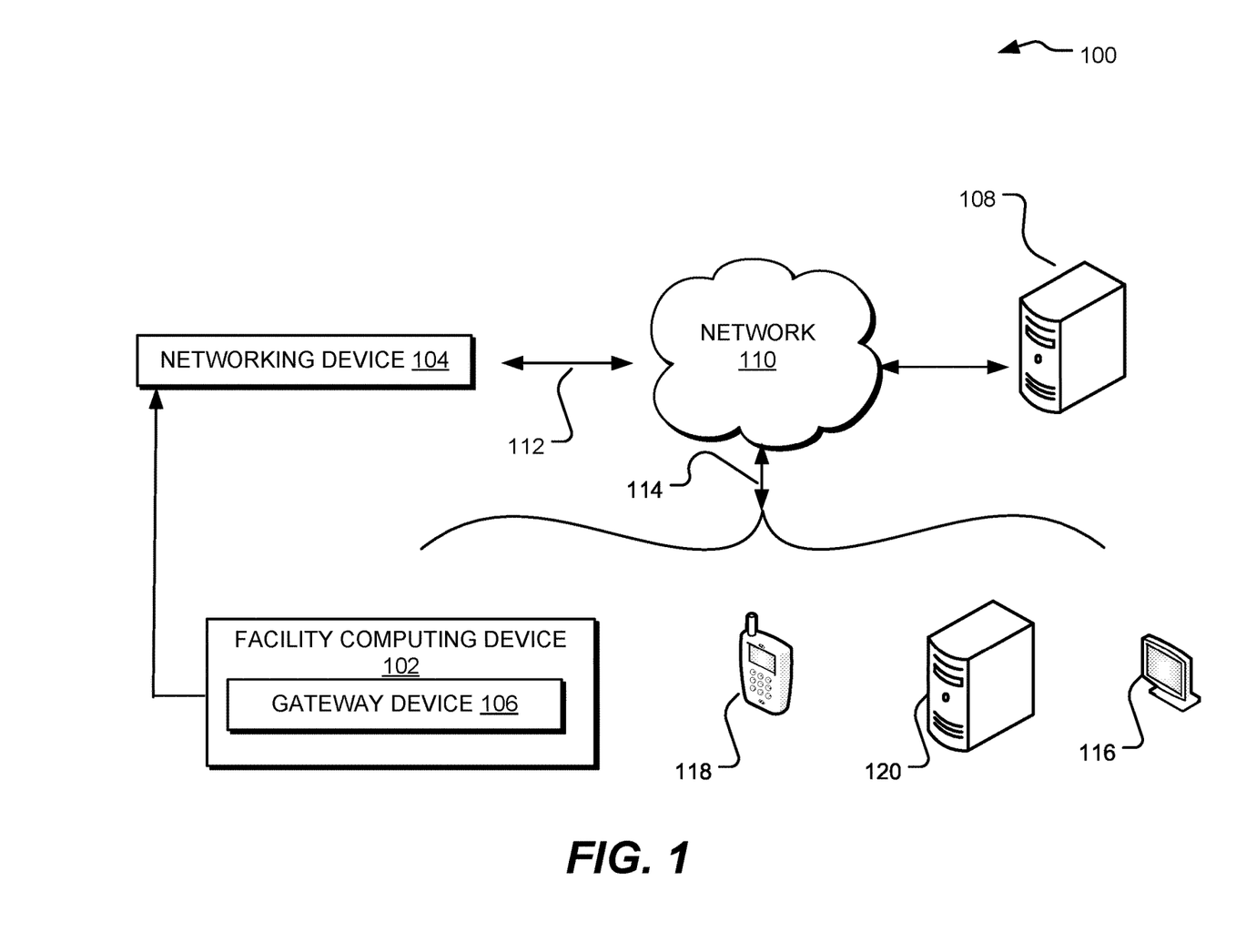
FIG. 1 illustrates an example system for determining real-time facility asset parameters.

FIG. 1 illustrates an example system 100 used to determine one or more facility asset parameters of one or more facility assets. The system 100 can include a facility computing device 102, a networking device 104, a gateway device 106, and/or a facility asset parameter computing device 108. These devices can execute one or more applications to generate, track, analyze, and/or output facility asset parameters associated with an operational site using real-time data acquired from one or more sensors associated with facility assets to improve maintenance and operation of the facility assets. The procedures performed by the system 100 discussed herein can use this configuration of the facility computing device 102, the networking device 104, the gateway device 106, and/or the facility asset parameter computing device 108 to improve facility asset management at the operational site. Moreover, the system 100 can cause operational data to be generated, aggregated, and/or analyzed on an hourly, daily, or even minute-by-minute basis to provide a real-time view (e.g., via a user interface) of the statuses of the various assets with improved accuracy, data flow efficiency, data upload timing, and overall efficiency of computing resources.

In some instances, facility computing device 102 can be a centralized device or office device that is part of a supervisory control and data acquisition (SCADA) system, such as, a programmable logic controller (PLC) located, at the operational site. The facility computing device 102 can receive, aggregate, and/or store the operational data for the operational site. The operational data is acquired by one or more sensors associated with various facility assets in real-time. The operational data can include data related to the operation and/or status of the facility assets (e.g., as discussed in greater detail below) that is continually updated via a plurality of data syncs. For instance, the operational site can include a local area network (LAN) or intranet to provide a communication channel between the one or more sensors and the facility computing device 102. In an implementation, the facility computing device 102 is one of a plurality of facility computing devices 102, each device associated with a respective operational site.

The operational data can include real-time information associated with the facility assets distributed throughout the operational site. For instance, the operational data can include a pump temperature (e.g., pump bearing), a pump speed (e.g., in percent), pump activation (e.g., on/off status), pump flow rate, tank gross volume, tank net volume, tank temperature, tank level, tank density, system flow, system pressure, and the like. In some instances, the operational data can further include an asset type, an asset identifier, a facility name associated with the asset, an asset description, and the like. The operational data can include Boolean or Real values.

In some instances, the facility computing device 102 is configured to store the operational data locally at a local storage device (e.g., at the operational site and/or physically coupled to, or forming, a part of the facility computing device 102). The facility computing device 102 can retain the operational data and/or the latest update of the operational data at the local storage device until a data upload is initiated and the operational data is sent to the gateway device 106. The data upload can be initiated in response to receiving an operator input. For instance, the operator input can be received at an operator user interface presented at the facility computing device 102. In some instances, the data upload occurs at regular intervals, such as, on an hourly, daily, or minute-by-minute basis.

In some instances, the gateway device 106 is a protocol converter device (e.g., devices bundled with ethernet bridges and having configurations and ratings that depend on the quantity, type and architecture of the facility computing device 102. In an instance, the operational data is mapped to read-only registers in the gateway device 106. In an instance where the facility computing device 102 is a PLC, the gateway device 106 can be mounted on a chassis of the PLC. The operational data is received at a back plane of the gateway device 106. The operational data is processed by a read only data table stored on a local memory of the gateway device 106 to generate asset data that is conditioned to allow the facility asset parameter computing device 108 to generate one or asset parameters using the asset data.

In some instances, the networking device 104 is configured to receive the asset data from the gateway device 106 via a wired connection (e.g., an ethernet port, a serial to ethernet converter, etc.). In some instances, the networking device 104 is a router. In an implementation where the facility computing device 102 is a PLC, the networking device 104 can be mounted in a cabinet of the PLC. In this implementation, the networking device may have an antenna mounted outside of or remote from the cabinet of the PLC. The networking device 104 is configured to communicate the asset data to the facility asset parameter computing device 108 via a network 110 and a first communication link 112. In some instances, the first communication link 112 is isolated from any links of the facility using a static Internet Protocol (IP) dedicated internet connection. The first communication link 112 provides a read-only, encrypted and isolated flow of data from the facility computing device 102 to the facility asset parameter computing device 108 that is independent from the facility's communication structure. The network 110 can be one or more of a local area network (LAN) (e.g., Wi-Fi, Bluetooth®, Near Field Communication (NFC), etc.) a wide area network (WAN) (e.g., ethernet, fiber, Internet-of-Things (IoT), the Internet, etc.), a cellular network (e.g., third generation (3G), fourth generation (4G), Long-Term Evolution (LTE), fifth generation (5G), etc.), and the like.

In some instances, the facility asset parameter computing device 108 is a server and/or database located outside the operational site (e.g., in a different region, city, country, etc.). In some instances, the facility asset parameter computing device 108 is provided as a cloud-based service that also includes a locally-stored application at the facility computing device 102. The data discussed herein can be stored at one or more database(s) (e.g., a storage device of the facility computing device 102 and/or storage devices of the facility asset parameter computing device 108) and can be executed by one or more servers of the facility asset parameter computing device 108. The facility asset parameter computing device 108 can be located remote from the operational site but can also include hardware components at the operational site. The database(s) can store any of the data files and/or software instructions discussed herein, including associations between these different data files. Moreover, the data in the database(s) can be aggregated to perform the operations discussed herein. The one or more servers of the facility asset parameter computing device 108 may be a single server, a plurality of servers with each such server being a physical server or a virtual machine, or a collection of both physical servers and virtual machines. In some instances, the data discussed herein is processed by a self-contained monolithic application operating on standalone virtual machines. The one or more servers may represent an instance among large instances of application servers in a cloud computing environment, a data center, or other computing environment. The one or more databases and/or the one or more servers can form a portion of one or more computing devices of the system 100, as discussed below regarding FIG. 8.

In some instances, the facility asset parameter computing device 108 generates one or more asset parameters using the asset data in real-time. The facility asset parameter computing device 108 then generates one or more user interfaces to indicate the one or more asset parameters. As discussed further below, the facility asset parameter computing device 108 can generate the user interface to include various visualizations and graphs representing one or more asset parameters. These can provide different levels of detailed information, which can correspond to key performance indicators and/or show different aspect of facility health with real-time signals. For instance, the facility asset parameter computing device 108 can use the regularly updated asset data to determine and show real-time fuel levels in a tank (e.g., with a calculation of how many days until more fuel is needed), tank temperature, pump status, usable inventory tracking, system trends, and give a real-time overview dashboard of the facility. The asset parameters and other analysis outputs of the facility asset parameter computing device 108 can be output as a part of a larger report representing key performance indicators for the operational site.

In some instances, the facility asset parameter computing device 108 communicates the generated one or more user interfaces to the facility computing device 102 using a second communication link 114 to cause the facility computing device 102 to display the one or more user interfaces. The second communication link 114 is independent and isolated from the first communication link 112. The second communication link 114 can be the facility's internet connection. In an implementation, the one or more user interfaces are also sent to additional computing devices, such as, a desktop computer 116, a mobile phone 118, a server 120, or the like using the second communication link 114, or additional communication links to cause the desktop computer 116, the mobile phone 118, the server 120, or the like to display the one or more user interfaces.

In some instances, the facility asset parameter computing device 108 generates an alert or warning and communicates the alert or warning to one or more of the facility computing device 102, the desktop computer 116, the mobile phone 118, the server 120, or the like using the second communication link 114. In some instances, the alert or warning can be generated based on the one or more asset parameters being above/below a predetermined threshold value. The alert or warning can be an audible or visual indication. In some instances, the alert or warning is part of a generated report. In an instance, the alert or warning is part of the generated user interface.

In some instances, the different components of the system 100 can be used by multiple different user categories, such as engineers, owners, site operators (e.g., lead site operators or general managers), field personnel, operator mechanics, and the like. Some personnel can have access to the system 100 via an application (e.g., as a web portal or application at the facility computing device 102, the desktop computer 116, the mobile phone 118, or the server 120) while other personnel can have access via a locally stored application on the facility computing device 102, the desktop computer 116, the mobile phone 118, or the server 120.

Figure 2:
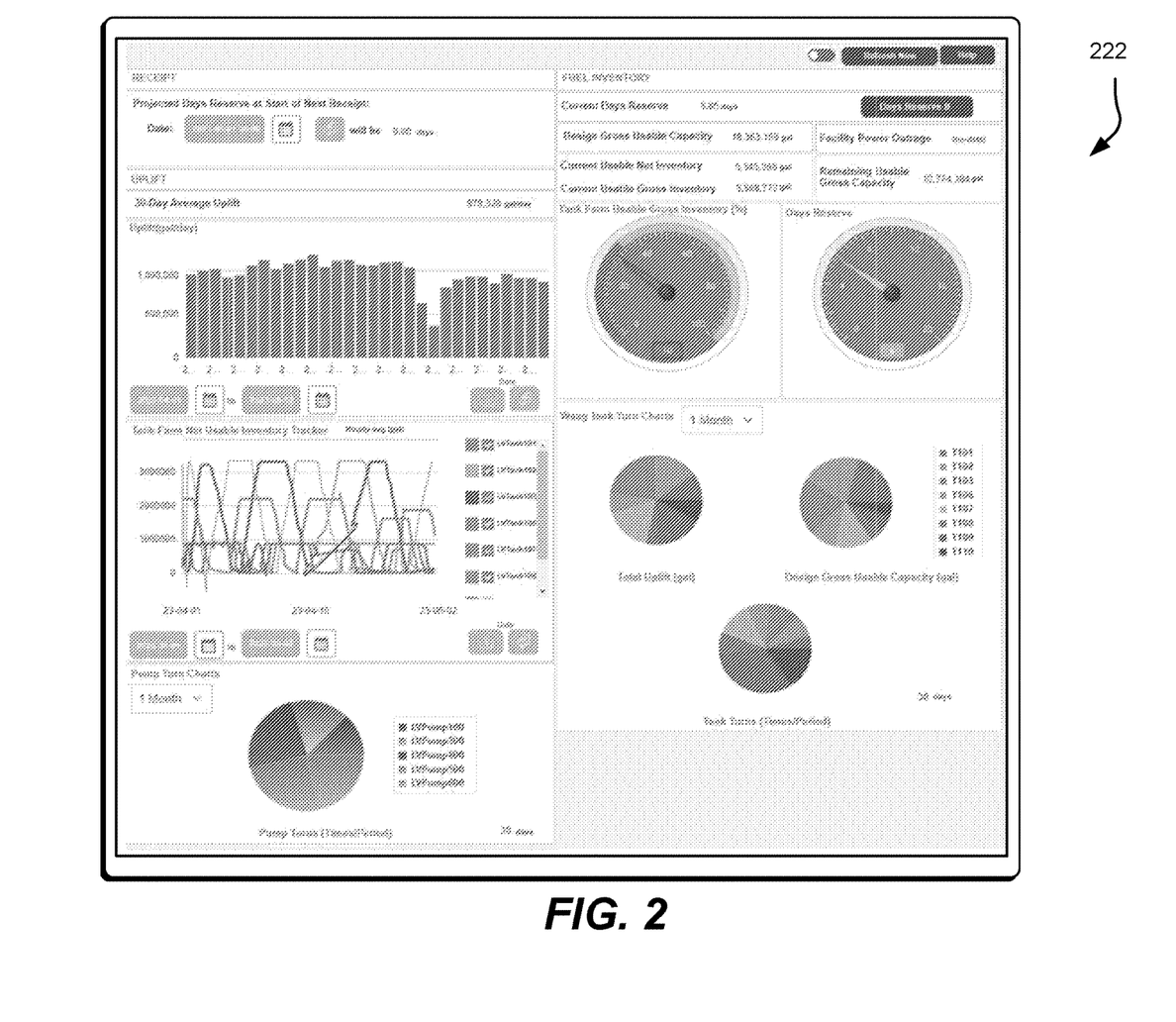
FIG. 2 illustrates an example user interface for indicating asset parameters using a business intelligence dashboard.

FIG. 2 illustrates an example user interface 222 generated by the facility asset parameter computing device 108. The user interface 222 indicates one or more asset parameters using a business intelligence dashboard. As depicted in FIG. 2, the user interface 222 can include various visual elements to represent the one or more asset parameters. For instance, the user interface can include one or more of a next receipt date, a selectable update next receipt input, current days reserve, days reserve if selected tanks are taken out of service, gross usable capacity, current useable net inventory, current useable gross inventory, remaining usable gross capacity, facility power outage, uplift, average uplift, net useable inventory, total inventory, current days reserve, Waag tank turn charts, and pump turn charts.

In an implementation, the a next receipt date is a date input by a user. The inputted next receipt date is displayed and used to generate a projected days reserve at start of next receipt. A selectable update next receipt input is also displayed to allow the operator to update the date that the receipt is expected. The current days reserve is generated based on the asset data received from the sensors. In some instances, the current days reserve is calculated by the equation: Total Useable Net Volume/[30 day Avg Uplift], 30 day Avg Uplift (gal/day)=[Uplift (Day 1)+Uplift (Day 2)+ . . . Uplift (Day 31)]/30 days. In an implementation, a selectable Days Reserve If button is displayed. If the button is selected by the operator, an interface is generated to allow the operator to select tanks to be taken out of service. The days reserve is then calculated and displayed without the selected tanks to simulate the reserves if certain tanks, or products inside, were not available. In an implementation, gross usable capacity is displayed as a numerical value. Gross usable capacity is the sum of useable design capacity of all the tanks above a Setpoint Useable Low threshold. In an implementation, current useable net inventory is displayed as a numerical value. In some instances, the current useable net inventory is calculated by the equation: Sum of all tanks: [(Level (ft)×Temperature Coefficient)−Set Point Useable Low (ft)]×Tank Capacity (gal)/Tank Height (ft) where Temperature Coefficient is determined based on the product (fluid) properties such as Specific Gravity. In an implementation, current useable gross inventory is displayed as one or more of a numerical value, a percentage, or graphical representation. Current useable gross inventory is the sum of all tanks gross inventory above a set useable low. The useable low can be input by the operator. In an implementation, remaining usable gross capacity is displayed as one or more of a numerical value, percentage, or graphical representation. The remaining usable gross capacity is unused (empty) capacity of the tank farm). In an implementation, a facility power outage is displayed. In an implementation, uplift is displayed using a numerical value or a graphical representation. The graphical representation can show gallon per time period (e.g., daily, weekly, hourly, etc.) pumped to a ramp of the facility. In an implementation average uplift (e.g., per day average) is displayed as numerical value or graphical representation. In an implementation, net useable inventory is displayed as a numerical value. Net usable inventory is net inventory of all tanks. In an implementation total inventory is displayed as a numerical value or a graphical representation. For instance, a gage showing a percentage of inventory from total design capacity can be generated and displayed. In an implementation Waag tank turn charts are generated and displayed fora selected time period (e.g., daily, monthly, etc.) Waag tank turn charts can be a pie chart illustrating contribution of each tank to total uplift, contribution of each tank to total gross useable capacity, and/or tank turns showing the throughput on each tank. In an implementation, pump turn charts are generated and displayed as a pie chart for a selected time period (e.g., daily, monthly, etc. The pump turn charts show a contribution of each pump to the total pump run hours. In an implementation, an average tank current gross volume tracker is displayed. The tracker can be a chart showing gross volume for a time period (e.g., daily, weekly, monthly, etc.).

Figure 3:
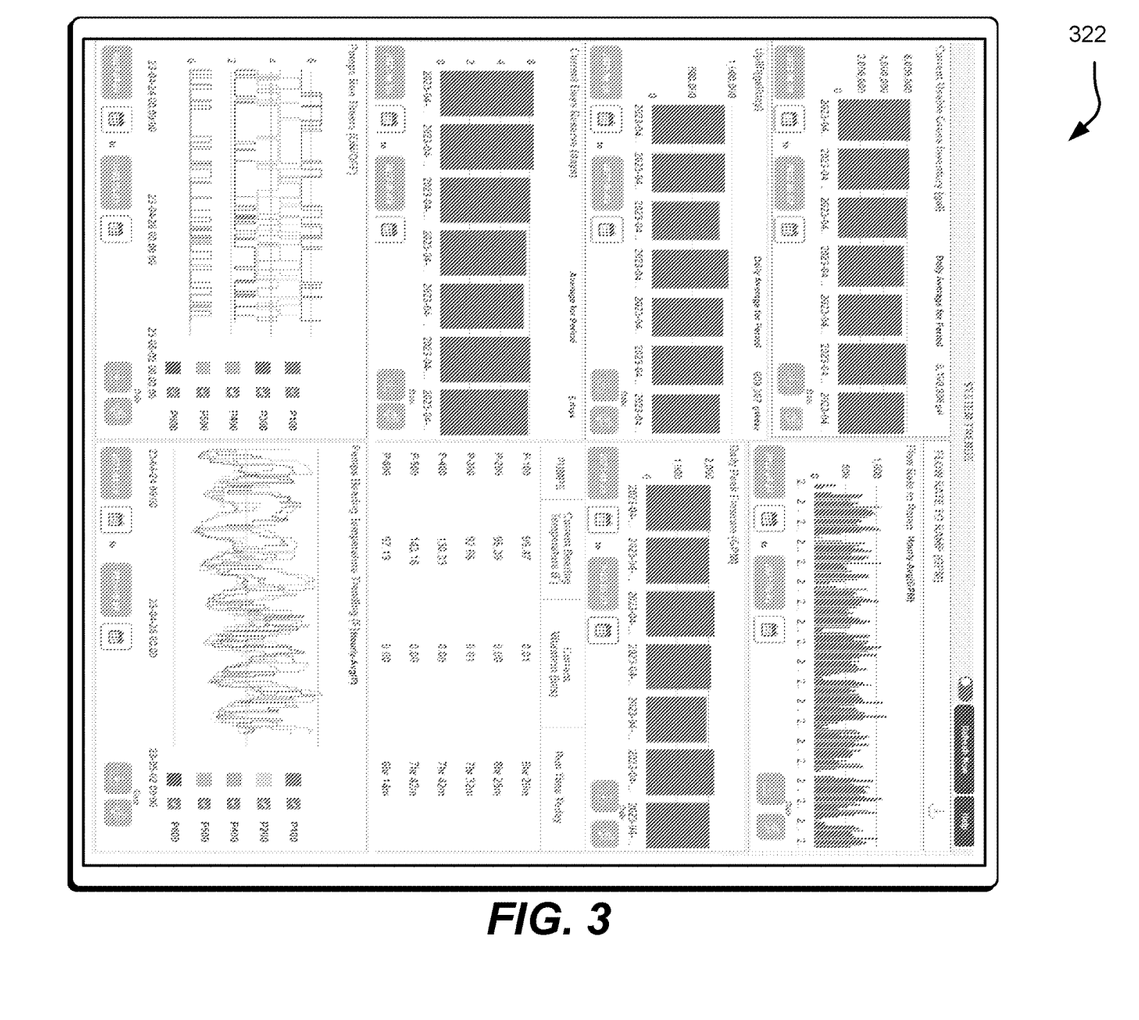
FIG. 3 illustrates an example user interface for indicating asset parameters using an engineering dashboard.

FIG. 3 illustrates an example user interface 322 generated by the facility asset parameter computing device 108. The user interface 322 indicates one or more asset parameters using an engineering dashboard. As depicted in FIG. 3, the user interface 322 can include various graphical representations such as bar and line graphs and pie charts to illustrate the one or more asset parameters. For instance, the user interface 322 can include one or more of a current useable gross inventory, current useable gross inventory daily average, uplift, average uplift, current days reserve, days reserve average, pump run times, flow rate to ramp, average flow rate to ramp, peak flow rate, pump temperature, pump vibration average pump run time, and average pump temperature.

In an implementation, the current useable gross inventory is generated and displayed as a numerical value and/or a bar graph for desired time periods (e.g., hourly, daily, monthly, etc.). In an implementation, uplift is displayed as a numerical value and/or bar graph. For instance, volume (e.g., gallon) per selected time period (hourly, daily, monthly, etc.) pumped to the ramp is displayed. In an implementation, current days reserve (e.g., calculated using the equation above) is displayed as an average for a selected time period (hourly, daily, etc.). For instance, the days reserve average is displayed as a numerical valuer and/or a graphical representation. In an implementation, pump run times are displayed using a numerical value and/or a graphical representation. The pump run times are determined using a pump run timer. In an implementation, flow rate to ramp is displayed as a numerical value and/or graphical representation. For instance, the flow rate to the ramp can be the current (e.g., real-time) flow rate. In an implementation, average flow rate to ramp for a selected time period (e.g., hourly, daily, monthly etc. average) is displayed as a numerical and/or graphical representation. In an implementation, peak flow rate for a time period (e.g., hourly, daily, monthly, etc.) is displayed as a numerical value and/or graphical representation. For instance, peak flow rate is a maximum flow rate experienced by the system. In an implementation, pump temperature is displayed as a numerical value and/or graphical representation. For instance, the pump temperature is a pump bearing temperature. In an implementation, pump vibration is displayed as a numerical value and/or graphical representation. For instance, the pump vibration is vibration of the pump in real-time. In an implementation, average pump run time is displayed as a numerical value and/or graphical representation for a desired time period (e.g., hourly, daily, weekly, etc.). In an implementation, average pump temperature is displayed as a numerical value and/or graphical representation. For instance, the average pump bearing temperature for a desired time period (e.g., hourly, daily, weekly, etc.) is displayed.

Figure 4:
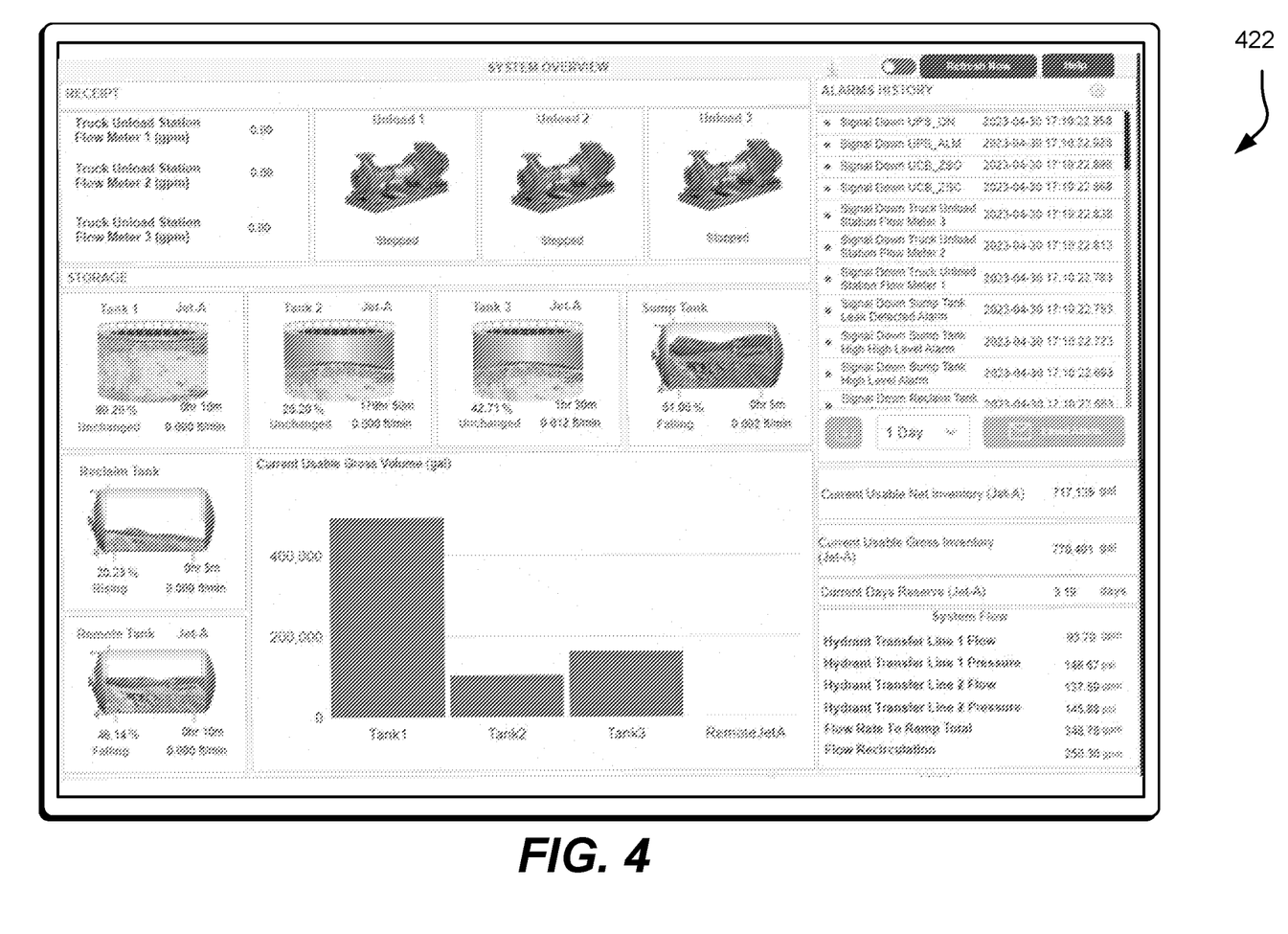
FIG. 4 illustrates an example user interface for indicating asset parameters using an operation and maintenance dashboard.
Figure 5:
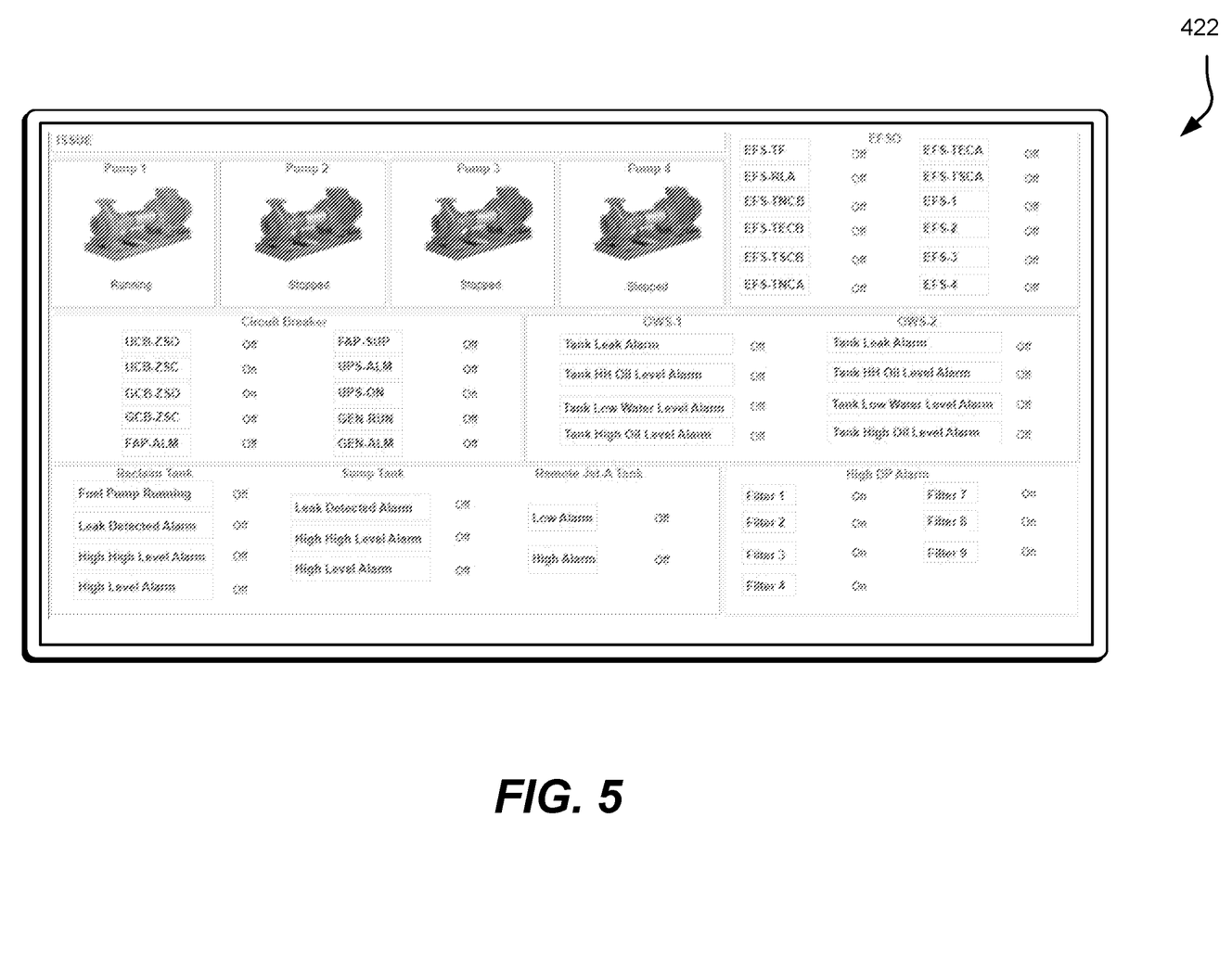
FIG. 5 illustrates an example user interface for indicating asset parameters using an operation and maintenance dashboard.

FIGS. 4 and 5 illustrate an example user interface 422 generated by the facility asset parameter computing device 108. The user interface 422 indicates one or more asset parameters using an operation and maintenance dashboard. As depicted in FIGS. 4 and 5, the user interface 422 can include various bar and line graphs and pie charts to illustrate the one or more asset parameters. For instance, the user interface 422 can include one or more of a pipeline flow rate, a batch size, total received, tank current volume, status of height of tank contents, rate of change of height of tank contents, duration of change of height of tank contents, current gross volume, the current useable gross inventory, the current useable net inventory, current days reserve, filter status, pump status, emergency fuel shut off (EFSO) status, uninterruptible power supply (UPS) status, oil-water separator status, main system pressure, backup system pressure, flow rate, and flow recirculating.

In an implementation, a pipeline flow rate is displayed as a numerical value. For instance, a receipt pipeline flow rate is displayed in gallons per minute. In an implementation, a batch size is displayed as a numerical value and/or graphical representation. For instance, a receipt batch and/or total received in gallons is indicated. In an implementation, tank current volume is displayed as a numerical value and/or graphical representation. For instance, the tank current volume is a percentage and determined using the equation: [Level(ft)/Tank Height (ft)]×100. In an implementation, status of height of tank contents is displayed using a numerical value and/or graphical representation. For instance, falling/rising/unchanged level of fluid, rate of change of height of tank contents (e.g., falling/rising rate in ft per min), duration of change of height of tank contents (e.g., falling/rising time in hr-min) are determined and indicated. In an implementation, current gross volume is displayed as a numerical value and/or graphical representation. For instance, the current gross volume is calculated using the following equation: [Level (ft)−Set Point Useable Low (ft)]×Tank Capacity (gal)/Tank Height (ft). In an implementation, one or more of the current useable gross inventory is determined using the equation above and is displayed as a numerical value and/or a graphical representation. In an implementation, the current useable net inventory (e.g., sum of all tanks gross inventory above a set point useable low), current days reserve (e.g., calculated using the equation above), filter status (e.g., a filter alarm), pump status (e.g., pump running/not running), emergency fuel shut off (EFSO) status (e.g., EFSO engagement on/off), uninterruptible power supply (UPS) status (e.g., UPS on/off based on received signals), oil-water separator status (e.g. oil-water separator on/off), main system pressure (e.g., main flow pressure to ramp), backup system pressure (e.g., backup flow pressure to ramp), flow rate (e.g., flow rate to ramp), flow recirculating and (e.g., gallons per minute) are displayed using a numerical value and/or graphical representation.)

Figure 6:
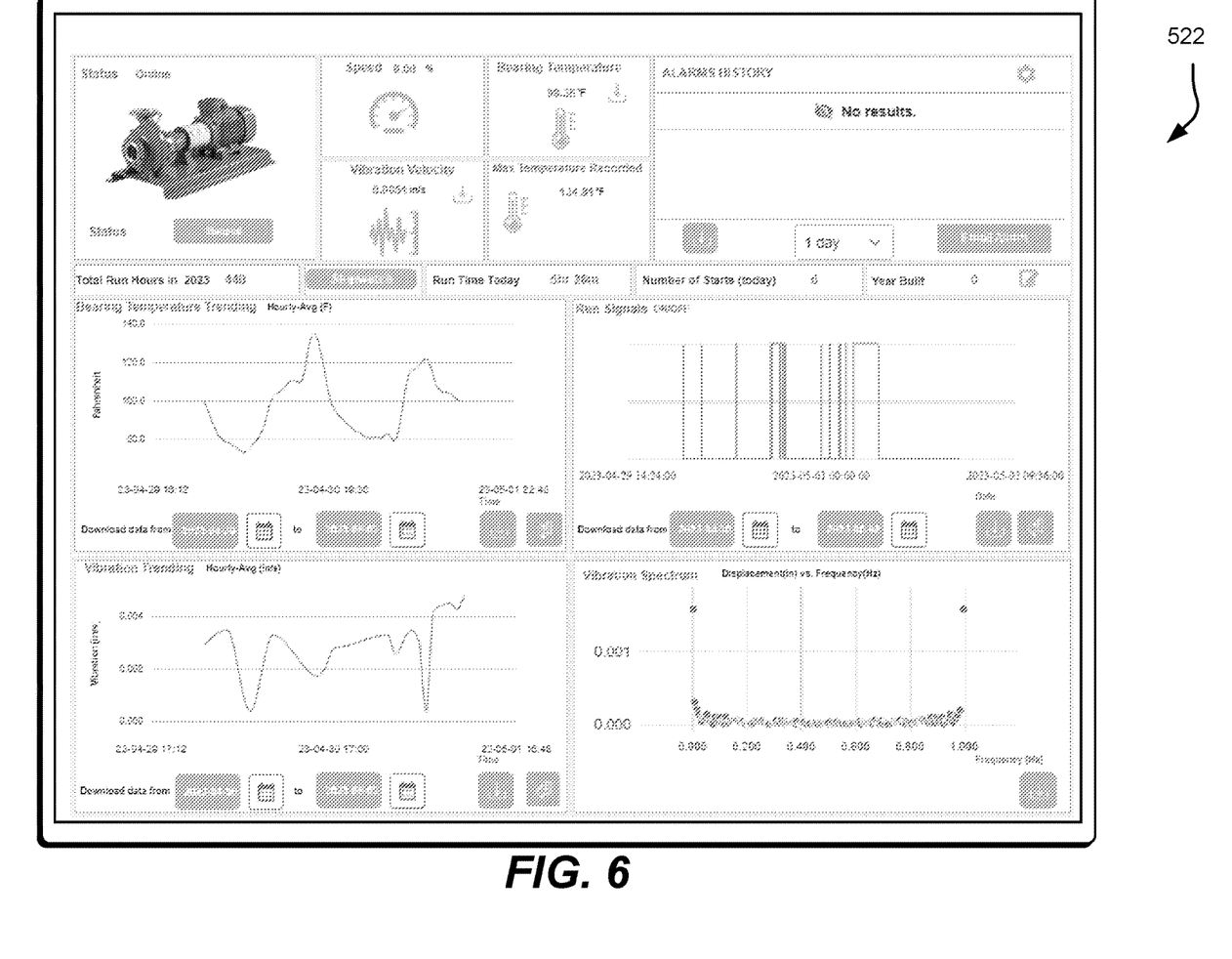
FIG. 6 illustrates an example user interface for indicating asset parameters using a pump dashboard.

FIG. 6 illustrates an example user interface 522 generated by the facility asset parameter computing device 108. The user interface 522 indicates one or more asset parameters using a pump dashboard. As depicted in FIG. 6, the user interface 522 can include various bar and line graphs and pie charts to illustrate the one or more asset parameters. For instance, the user interface 522 can include one or more of pump status (e.g., pump currently running/stopped), speed (e.g., Variable Frequency Drive (VFD) speed of the pump as a percentage), temperature (e.g., bearing temperature), vibration velocity (e.g., current vibration of the pump in inch/second), total run hours (e.g., total run hours of pump to date), average run time (e.g., average daily running hours), number of starts (e.g., number per day), pump details (e.g., year of manufacture entered by user and/or retrieved from pump manufacturer), vibration spectrum (e.g., Fast Fourier Transformation of vibration velocity), and run signals (e.g., using run timers for individual pumps).

Figure 7:
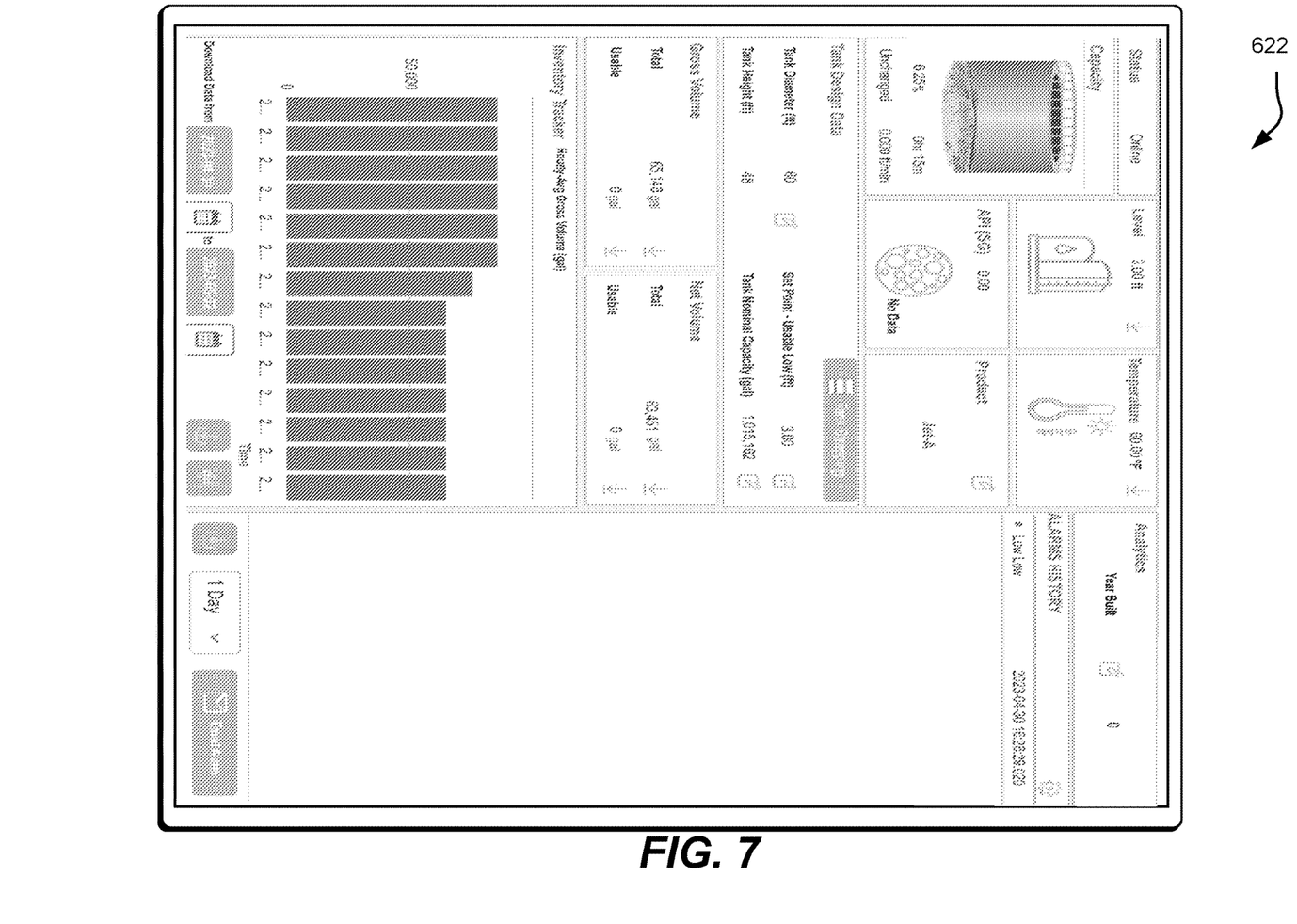
FIG. 7 illustrates an example user interface for indicating asset parameters using a tank dashboard.

FIG. 7 illustrates an example user interface 622 generated by the facility asset parameter computing device 108. The user interface 622 indicates one or more asset parameters using a pump dashboard. As depicted in FIG. 7, the user interface 622 can include various bar and line graphs and pie charts to illustrate the one or more asset parameters. For instance, the user interface 622 can include one or more of tank status (e.g., whether facility computing device 102 is communicating with sensors associated with the tank in real-time), tank current volume (e.g., using the equation below), real time movement of the fluid (e.g., text showing status of the lateral movement of the fluid, such as, falling/rising/unchanged), rate of height change (rate change of height of fluid in feet per minute), time of change in height (e.g., duration of falling/rising time), level (e.g., current height of fluid in tank), API gravity (e.g., specific gravity), temperature (e.g., current temperature of fluid in the tank), product name of tank contents, tank diameter (e.g., tank design diameter), tank height (e.g., tank design height), useable low set point (e.g., design low level height), tank nominal capacity (e.g., tank design capacity), current gross volume (e.g., volume quantity read from a strapping table at the current level and set point useable low level), current useable gross volume (e.g., Current Gross Volume (gal)−Volume (gal) below "Set Point Useable Low" level. Both volume quantities can be read from the strapping table at the current level and set point useable low level), current net volume (e.g., calculated using the equation below), current useable net volume (e.g., calculated using the equation below), and average tank current gross volume tracker (e.g., chart showing hourly average current gross volume).

In an implementation, the tank status indicates whether facility computing device 102 is communicating with sensors associated with the tank in real-time using text. In an implementation, tank current volume is displayed as a numerical value and/or graphical representation. For instance, tank current volume is determined using the equation: [Current Gross Volume (gal)/Tank Max Gross Volume (gal)]×100. In some instances, both volume quantities are read from a strapping table at a maximum level and a current level. In an implementation, the real time movement of the fluid is indicated using text showing status of the lateral movement of the fluid, such as, falling/rising/unchanged), rate of height change (e.g., rate change of height of fluid in feet per minute), time of change in height (e.g., duration of falling/rising time), level (e.g., current height of fluid in tank). In an implementation, API gravity (e.g., specific gravity), temperature (e.g., current temperature of fluid in the tank), product name of tank contents (e.g., entered by user or retrieved from the manufacturer), tank diameter (e.g., tank design diameter), tank height (e.g., tank design height), useable low set point (e.g., design low level height), tank nominal capacity (e.g., tank design capacity), current gross volume (e.g., volume quantity read from a strapping table at the current level and set point useable low level), current useable gross volume (e.g., Current Gross Volume (gal)−Volume (gal) below "Set Point Useable Low" level. Both volume quantities can be read from the strapping table at the current level and set point useable low level) are indicated using numerical values and/or graphical representation. In an implementation, current net volume is calculated using the following equation: Current Gross Volume (gal)×[Temperature Coefficient]. In some instances, gross volume quantities are read from the strapping table at the current level. In an implementation, current useable net volume is calculated using the following equation: Current Gross Volume (gal)×[Temperature Coefficient]. In some instances, gross volume quantities are read from the strapping table at the current level. In an implementation, average tank current gross volume tracker (e.g., chart showing hourly average current gross volume) is indicated using numerical value and/or a graphical representation.

Figure 8:
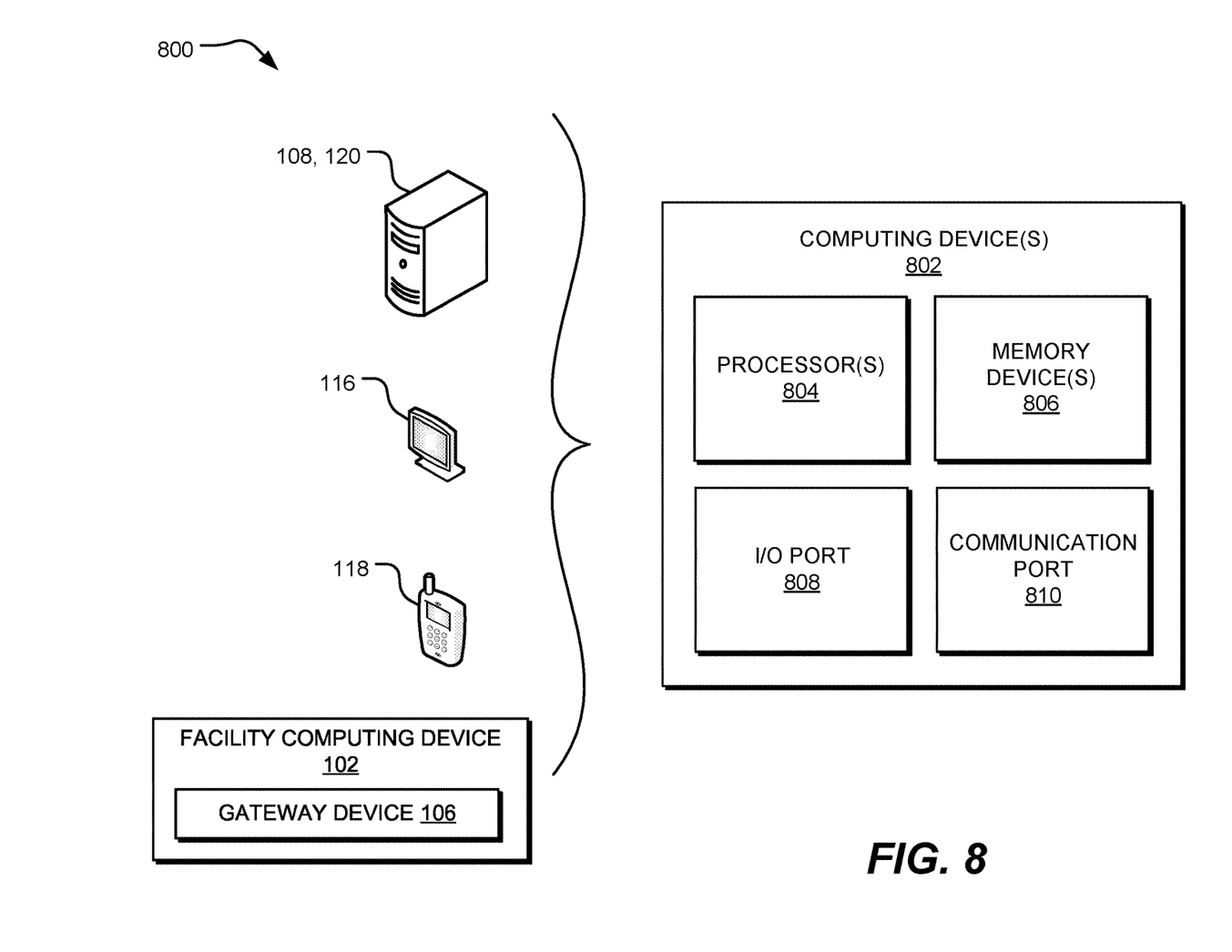
FIG. 8 illustrates an example system for determining real-time facility asset parameters using one or more computing devices.

FIG. 8 illustrates an example system 800 for determining facility asset parameters using one or more computing device(s) 802, which implements the system 100 discussed herein. In one implementation, the one or more computing device(s) 802 include the facility computing device 102, facility asset parameter computing device 108, desktop computer 116, mobile phone 118, and/or server 120.

In some instances, the one or more computing device(s) 802 includes a computer, a personal computer, a desktop computer, a laptop computer, a terminal, a workstation, a cellular or mobile phone, a mobile device, a smart mobile device a tablet, a wearable device (e.g., a smart watch, smart glasses, a smart epidermal device, etc.) a multimedia console, a television, an Internet-of-Things (IoT) device, a virtual reality (VR) or augmented reality (AR) device, and/or the like. The one or more computing device(s) 802 may be integrated with, form a part of, or otherwise be associated with the system 100. It will be appreciated that specific implementations of these devices may be of differing possible specific computing architectures not all of which are specifically discussed herein but will be understood by those of ordinary skill in the art.

The one or more computing device(s) 802 may be a computing system capable of executing a computer program product to execute a computer process. The system 100 can be stored and executed at the one or more computing device(s) 802 (e.g., as one or more software components). Data and program files may be input to the one or more computing device(s) 802 (e.g., sensor data, the user inputs, etc.), which can read the data and executes the programs therein to implement the facility asset parameter computing device 108. Some of the elements of the one or more computing device(s) 802 include one or more hardware processors 804, one or more memory devices 806, and/or one or more ports, such as input/output (IO) port 808 and communication port 810. Additionally, other elements that will be recognized by those skilled in the art may be included in the one or more computing device(s) 802 but are not explicitly depicted in FIG. 8 or discussed further herein. Various elements of the one or more computing device(s) 802 may communicate with one another by way of the communication port 810 and/or one or more communication buses, point-to-point communication paths, or other communication means.

The one or more hardware processors 804 may include, for example, a central processing unit (CPU), a microprocessor, a microcontroller, a digital signal processor (DSP), and/or one or more internal levels of cache. The one or more processors 804 may comprise a single central-processing unit, or a plurality of processing units capable of executing instructions and performing operations in parallel with each other, commonly referred to as a parallel processing environment.

The one or more computing device(s) 802 may be stand-alone computer, a distributed computer, or any other type of computer, such as one or more external computers made available via a cloud computing architecture. The presently described technology is optionally implemented in software stored on the data storage device(s) such as the one or more memory devices 806, and/or communicated via one or more of the ports 808 and 810, thereby transforming the one or more computing device(s) 802 in FIG. 8 to a special purpose machine for implementing the operations described herein. Moreover, the unconventional arrangement of the one or more computing devices 802 into the facility asset parameter computing device (e.g., including the gateway device 106, networking device 104, and the applications and web portals executing thereon) improves the fields of technology of facility asset data tracking and data management.

The one or more memory devices 806 may include any non-volatile data storage device capable of storing data generated or employed within the one or more computing device(s) 802, such as computer-executable instructions for performing a computer process, which may include instructions of both application programs and an operating system (OS) that manages the various components of the one or more computing device(s) 802. The one or more memory devices 806 may include, without limitation, magnetic disk drives, optical disk drives, solid state drives (SSDs), flash drives, and the like. The one or more memory devices 806 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory device(s) 1506 may include volatile memory (e.g., dynamic random-access memory (DRAM), static random-access memory (SRAM), etc.) and/or non-volatile memory (e.g., read-only memory (ROM), flash memory, etc.).

Computer program products containing mechanisms to effectuate the systems and methods in accordance with the presently described technology may reside in the one or more memory devices 806 which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the one or more computing device(s) 802 includes one or more ports, such as the I/O port 808 and the communication port 810, for communicating with other computing, network, or vehicle devices. It will be appreciated that the I/O port 808 and the communication port 810 may be combined or separate and that more or fewer ports may be included in the one or more computing device(s) 802.

The I/O port 808 may be connected to an I/O device, or other device, by which information is input to or output from the one or more computing device(s) 802. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the one or more computing device(s) 802 via the I/O port 808. Similarly, the output devices may convert electrical signals received from the one or more computing device(s) 802 via the I/O port 808 into signals that may be sensed as output by a human, such as sound, light, and/or touch. The input device may be an alphanumeric input device, including alphanumeric and other keys for communicating information and/or command selections to the one or more hardware processors 804 via the I/O port 808. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

In one implementation, the communication port 810 can connect to the network (e.g., the LAN during the data sync and/or the WAN during the external upload, as discussed above) and the one or more computing device(s) 802 may receive network data useful in executing the methods and systems set out herein as well as transmitting information and network configuration changes determined thereby. Stated differently, the communication port 810 can connect the different one or more computing device(s) 802 disclosed herein to one or more communication interface devices configured to transmit and/or receive information between the one or more computing device(s) 802 and other one or more computing device(s) 802 by way of one or more wired or wireless communication networks or connections. Examples of such networks or connections include, without limitation, Universal Serial Bus (USB), Ethernet, Wi-Fi, Bluetooth®, Near Field Communication (NFC), and so on, as discussed above. One or more such communication interface devices may be utilized via the communication port 810 to communicate one or more other machines, either directly over a point-to-point communication path, mesh networks, or over another communication means. Further, the communication port 810 may communicate with an antenna or other link for electromagnetic signal transmission and/or reception.

In an example implementation, the system 100 and/or the facility asset parameter computing device 108 may be embodied by instructions stored on the one or more memory devices 806 and executed by the one or more hardware processors 804.

The system 800 set forth in FIG. 8 includes but one possible example of one or more computing device(s) 802 that may employ or be configured in accordance with aspects of the present disclosure. It will be appreciated that other non-transitory tangible computer-readable storage media storing computer-executable instructions for implementing the presently disclosed technology on a computing system may be utilized. In the present disclosure, the methods disclosed may be implemented as sets of instructions or software readable by the one or more computing device(s) 802.

Figure 9:
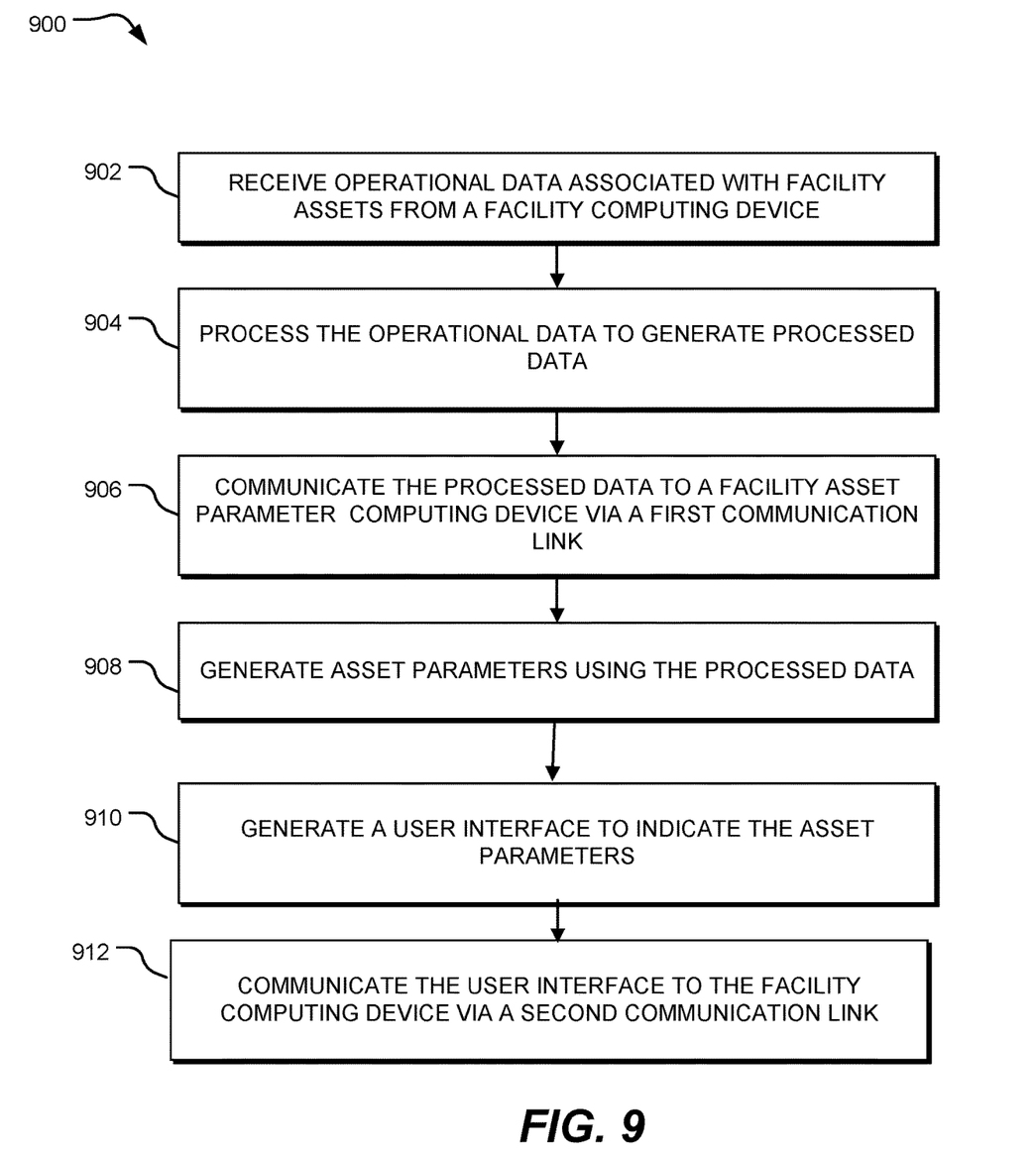
FIG. 9 illustrates an example method for determining real-time facility asset parameters.

FIG. 9 illustrates an example method 900 to determine one or more asset parameters using the system 100 disclosed herein.

In some examples, at operation 902, the method 900 receives operational data associated with one or more facility assets from the facility computing device 102. At operation 904, the method 900 processes the operational data to generate asset data. At operation 906, the method 900 communicates the asset data to the facility asset parameter computing device 108 via the first communication link 112. At operation 908, the method 900 generates one or more asset parameters using the asset data. At operation 910, the method 900 generates a user interface to indicate the one or more asset parameters. At operation 912, the method 900 communicates the user interface to the facility computing device 102 via the second communication link 114.

It is to be understood that the specific order or hierarchy of steps in the method(s) depicted in FIG. 9, and throughout this disclosure, are instances of example approaches and can be rearranged while remaining within the disclosed subject matter. For instance, any of the operations depicted in FIG. 9 or throughout this disclosure may be omitted, repeated, performed in parallel, performed in a different order, and/or combined with any other of the operations depicted in FIG. 9 or throughout this disclosure.

While the present disclosure has been described with reference to various implementations, it will be understood that these implementations are illustrative and that the scope of the present disclosure is not limited to them. Many variations, modifications, additions, and improvements are possible. More generally, implementations in accordance with the present disclosure have been described in the context of particular implementations. Functionality may be separated or combined differently in various implementations of the disclosure or described with different terminology. These and other variations, modifications, additions, and improvements may fall within the scope of the disclosure as defined in the claims that follow.

What is claimed is:

1. A method comprising:
   receiving operational data associated with one or more facility assets from a facility computing device, the operational data acquired via one or more sensors associated with the one or more facility assets;
   generating asset data by processing the operational data using a gateway device;
   communicating, via a networking device, the asset data to a facility asset parameter computing device using a first communication link;
   generating, via the facility asset parameter computing device, one or more asset parameters using the asset data;
   generating, via the facility asset parameter computing device, one or more user interfaces to indicate the one or more asset parameters; and
   communicating the one or more user interfaces to the facility computing device via a second communication link.

2. The method of claim 1 further comprising:
   generating, via the facility asset parameter computing device, an alert associated with the one or more asset parameters; and
   communicating, via the second communication link, the alert to the facility computing device to cause the facility computing device to indicate the alert.

3. The method of claim 1 further comprising:
   communicating, via the second communication link, the one or more user interfaces to one or more additional computing devices to cause the one or more additional computing devices to output the one or more user interfaces.

4. The method of claim 1, wherein the facility computing device outputs the one or more user interfaces.

5. The method of claim 1, wherein the networking device is a router, and the gateway device is a protocol converter device.

6. The method of claim 1, wherein the first communication link uses a static Internet Protocol (IP) dedicated internet connection.

7. The method of claim 1, wherein the facility computing device is a programmable logic controller (PLC), and the gateway device is mounted to a chassis of the PLC.

8. The method of claim 1, wherein the second communication link uses an internet connection of a facility associated with the one or more facility assets.

9. The method of claim 1, wherein the gateway device processes the operational data using a read only data table stored on a local memory of the gateway device to generate the asset data.

10. The method of claim 1, wherein the first communication link is isolated from the second communication link.

11. A system comprising:
- a gateway device configured to receive operational data associated with one or more facility assets from a facility computing device, the gateway device configured to process the operational data to generate asset data;
- a networking device configured to communicate the asset data via a first communication link; and
- a facility asset parameter computing device configured to receive the asset data via the first communication link and generate one or more user interfaces indicating one or more asset parameters, the one or more user interfaces communicated to the facility computing device via a second communication link.

12. The system of claim 11, wherein the facility asset parameter computing device is further configured to generate an alert associated with the one or more asset parameters and communicate, via the second communication link, the alert to the facility computing device to cause the facility computing device to indicate the alert.

13. The system of claim 11 further comprising:
- wherein the facility asset parameter computing device is further configured to communicate, via the second communication link, the one or more user interfaces to one or more additional computing devices to cause the one or more additional computing devices to output the one or more user interfaces.

14. The system of claim 11, wherein:
- the networking device is a router, the gateway device is a protocol converter device, and the facility computing device is a programmable logic controller (PLC), and the gateway device is mounted to a chassis of the PLC.

15. The system of claim 11, wherein the facility computing device outputs the one or more user interfaces.

16. The system of claim 11, wherein the second communication link uses an internet connection of a facility associated with the one or more facility assets.

17. The system of claim 11, wherein the first communication link uses a static Internet Protocol (IP) dedicated internet connection.

18. The system of claim 11, wherein the gateway device processes the operational data using a read only data table stored on a local memory of the gateway device to generate the asset data.

19. The system of claim 11, wherein the first communication link is isolated from the second communication link.

20. A non-transitory computer readable medium storing instructions, which when executed by at least one data processor, result in operations comprising:
- receiving operational data associated with one or more facility assets from a facility computing device;
- generating asset data by processing the operational data;
- communicating the asset data to a facility asset parameter computing device using a first communication link;
- generating one or more asset parameters using the asset data;
- generating one or more user interfaces to indicate the one or more asset parameters; and
- communicating the one or more user interfaces to the facility computing device via a second communication link.

* * * * *